United States Patent [19]

Vorih

[11] Patent Number: 5,221,407

[45] Date of Patent: Jun. 22, 1993

[54] DEVICE FOR FEEDING HOT EXTRUDED TIRE TREAD PORTIONS DIRECTLY TO AN AUTOMOTIVE TIRE BUILDING MACHINE

[75] Inventor: William J. Vorih, Rome, Italy

[73] Assignee: Bridgestone Corporation, Tokyo, Japan

[21] Appl. No.: 687,356

[22] Filed: Apr. 18, 1991

[30] Foreign Application Priority Data

Apr. 27, 1990 [IT] Italy .......................................... 67319

[51] Int. Cl.⁵ ............................................ B29D 30/30
[52] U.S. Cl. ............................... 156/406.4; 156/130; 156/405.1; 156/510
[58] Field of Search ................. 156/405.1, 406.4, 123, 156/130, 495, 566, 351, 362, 510; 198/575, 576, 577, 579, 593, 602, 604; 83/403.1; 425/308; 226/111, 122, 112

[56] References Cited

U.S. PATENT DOCUMENTS

| | | |
|---|---|---|
| 1,594,845 | 8/1926 | Myers . |
| 1,973,059 | 9/1934 | Gerke . |
| 2,726,922 | 12/1955 | Merrill et al. . |
| 3,011,211 | 12/1961 | Barns . |
| 3,284,850 | 11/1966 | Verly . |
| 3,455,764 | 7/1969 | Bryant . |
| 3,847,705 | 11/1974 | Habert et al. . |
| 4,233,255 | 11/1980 | Moon . |
| 4,474,338 | 10/1984 | Hirano et al. ........................ 242/55 |
| 4,832,243 | 5/1989 | Usami .............................. 156/406.4 X |
| 4,877,468 | 10/1989 | Siegenthaler ........................ 156/111 |
| 4,892,609 | 1/1990 | Nakanome et al. ............... 156/406.4 |
| 5,049,222 | 9/1951 | Irie .............................. 156/406.4 X |

OTHER PUBLICATIONS

Gummibereifung-vol. 53, No. 2, Feb. 1977; Paul Mayer; pp. 28 & 30.

Primary Examiner—Geoffrey L. Knable
Attorney, Agent, or Firm—David A. Thomas

[57] ABSTRACT

A method and device for feeding hot portions (4) of extruded tire tread (3) directly to a tire building machine (5), whereby tread portions (4) of given length, obtained by cutting a tread (3) produced continuously by an extruder (2) at a first speed (V1), are fed successively to the tire building machine (5), with no distortion or stretching and at a second speed (V2) differing from the first (V1), by means of a feed device (1) having an input conveyor (11) for receiving the continuous tread (3) at the first speed (V1) and feeding it through a cutting station (12) to an output conveyor (17) at least equal in length to the tread portion (4); during each cycle for feeding each tread portion (4) to the tire building machine (5), the output conveyor (17) undergoes at least four variations in speed, so as to assume, at least once, a speed substantially equal to zero, and three different traveling speeds (V1, V2, V3), of which two (V1, V2) are equal to the first (V1) and second (V2) speeds respectively.

4 Claims, 6 Drawing Sheets

DEVICE FOR FEEDING HOT EXTRUDED TIRE TREAD PORTIONS DIRECTLY TO AN AUTOMOTIVE TIRE BUILDING MACHINE

TECHNICAL FIELD

The present invention relates to a method of feeding a hot, particularly extruded, tire tread directly to a tire building machine.

BACKGROUND OF THE ART

The aim of the present invention is to enable a tire building machine to be fed fully automatically with a succession of continuously extruded tread portions of predetermined length. A further aim of the present invention is to enable a tread portion to be fed to a tire building machine without inducing unwanted stress or distortion in the tread portion itself. A further aim of the present invention is to enable a tread portion to be transferred from an extruder, whereby the tread is produced continuously, to a tire building machine in such a manner as to preserve as much of the original extrusion heat as possible inside the tread portion.

DISCLOSURE OF THE INVENTION

With these aims in view, according to the present invention, there is provided a method of feeding hot tire tread portions directly to a tire building machine, said tread being produced continuously by an extruder at a first given speed, and being fed, along a route extending between said extruder and said tire building machine, by means of a feed device operating according to a given feed pattern; characterized by the fact that said feed pattern provides for an initial stage consisting in feeding said tread along a first portion of said route at a first substantially constant speed equal to the speed at which said tread is extruded, said first route portion extending through a cutting station in which said tread is cut into portions of given length; and a final stage consisting in feeding each tread portion to said tire building machine along a final portion of said route and at a second speed differing from said first speed and equal to the absorption speed of said tire building machine; each tread portion being fed to said tire building machine at said second speed by means of an output conveyor of substantially the same length as said tread portion; said output conveyor undergoing, at each complete cycle for feeding each tread portion to said tire building machine, at least four variations in speed, so as to assume, at least once, a speed substantially equal to zero, and three different traveling speeds, of which two are respectively equal to said first and second speeds, while the third speed is greater than said first speed; a further stage being provided for, consisting in applying said tread onto said tire building machine via applying means; said output conveyor assuming said at-least-one-time zero speed immediately prior to said application stage.

The above method provides for continuously receiving the tread at the speed at which it is produced by the extruder, and, after cutting it into portions, for continuously feeding it onto the output conveyor, which, after being arrested for synchronizing with the tire building machine and enabling application of the tread portions to the same, may be operated for feeding the tread portions at said second machine absorption speed. In this way, it is possible to minimize traveling time of the tread portions between the extruder and tire building machine, without inducing unwanted stress or distortion in the same.

The present invention also relates to a device for feeding hot tread portions directly to a tire building machine, said tread being produced continuously by an extruder at a first given speed, and said feed device extending along a given route between said extruder and said tire building machine; characterized by the fact that it comprises first conveyor means designed to receive said tread from said extruder and feed it along a first portion of said route; first activating means assigned to said first conveyor means for activating same at a speed substantially equal to said first speed; a cutting station, through which said first conveyor means travel, for cutting said tread into said portions of given length; second conveyor means, of substantially the same length as said tread portion, for successively feeding said tread portions to said tire building machine; second activating means assigned to said second conveyor means for selectively activating same at three different speeds, of which a first is equal to said first speed, a second is equal to the absorption speed of said tire building machine, and a third speed which is greater than said first speed; and applying means for applying each tread portion onto said tire building machine.

A non-limiting embodiment of the present invention will now be described by way of example with reference to the accompanying drawings, in which:

BEST MODE FOR CARRYING OUT THE INVENTION

Number 1 in FIGS. 1 and 2 indicates a feed device assigned to an extruder 2 for continuously extruding a tread 3 (FIG. 7) subsequently cut into portions 4 (FIG. 7) of given length along device 1. Device 1 is located between extruder 2 and a tire building machine 5 (FIG. 2) comprising a known drum 6 designed to successively receive portions 4 for forming the outer carcasses (not shown) of respective tires.

Device 1 defines, for portions 4, a route extending from the outlet 7 of extruder 2 to the periphery of drum 6 and substantially perpendicular to the drum 6 axis. Device 1 comprises a substantially horizontal frame 8 supported on uprights 9 and supporting, as of extruder 2, an idle roller bed 10; an input conveyor 11 extending through a cutting station 12 comprising a rotary blade 13 designed to move, in known manner (not shown), crosswise in relation to conveyor 11; an intermediate conveyor 14, the input of which is separated from the output of input conveyor 11 by a transition conveyor 15 comprising a given number of idle rollers 16 (FIG. 3); and an output conveyor 17.

Figure 2:
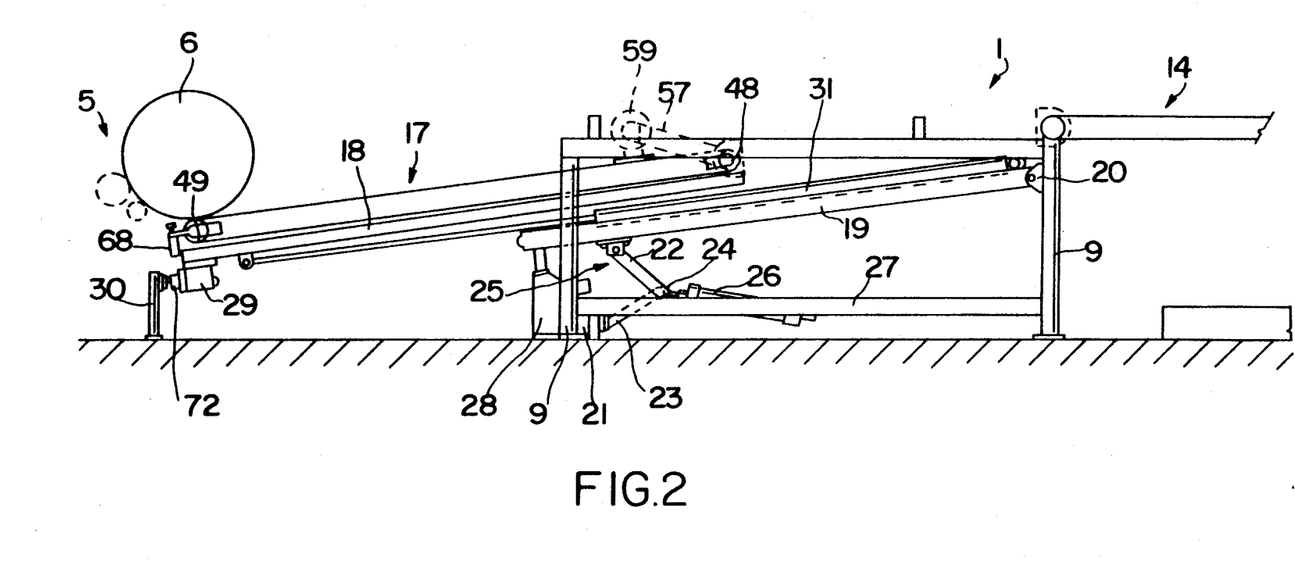
FIG. 2 shows a side view of a detail in FIG. 1 in a different operating position.

As shown, particularly in FIG. 2, output conveyor 17 is mounted on a carriage 18, the front end of which (in the traveling direction of tread 3) is connected in sliding manner (not shown) to a respective portion of frame 8, so as to slide substantially horizontally along the same. Carriage 18 is connected, in sliding manner (not shown), to a bottom guide 19, the front end of which pivots at point 20 on an upright 9 of frame 8, and the intermediate portion of which is connected to a bottom crossmember 21 of frame 8 by means of two levers 22 and 23 hinged at point 24 so as to define a compass 25. Compass 25 is opened by a hydraulic actuator 26, one end of which is hinged to a side member 27 extending between two end uprights 9 of the frame 8 portion supporting output conveyor 17, and the other end of which is hinged at point 24 to compass 25.

Figure 1:
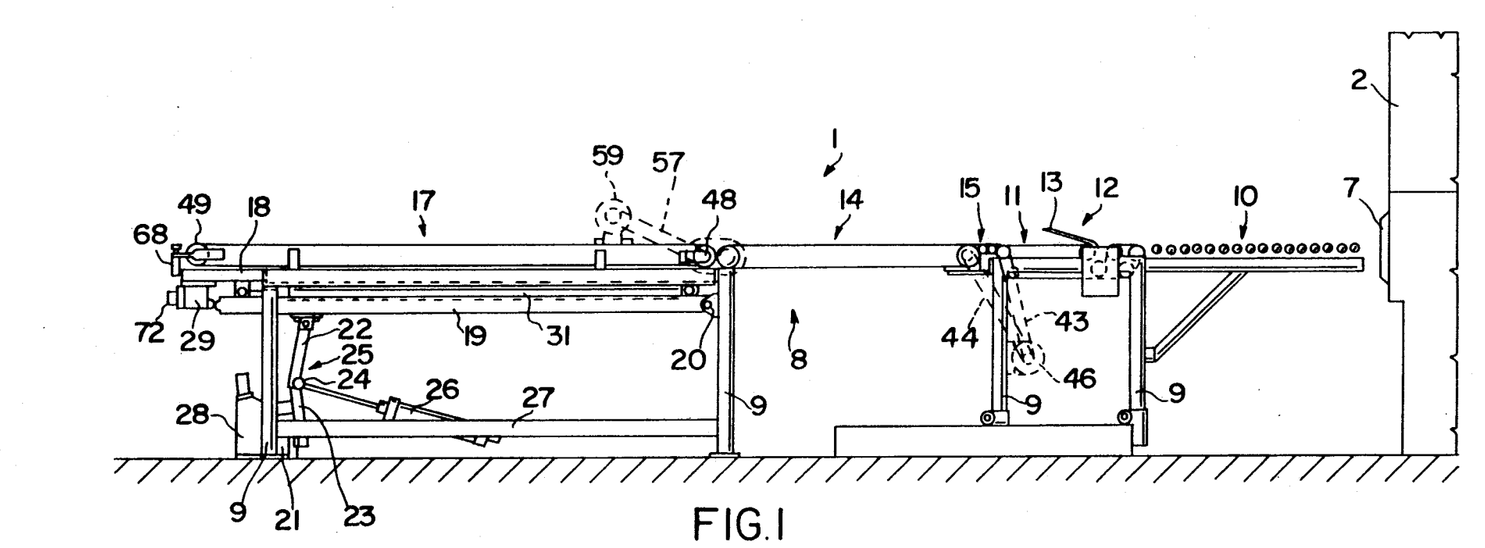
FIG. 1 shows a side view, with parts removed for simplicity, of a preferred embodiment of the feed device according to the present invention.

As shown in FIGS. 1 and 2, operation of actuator 26 moves levers 22 and 23 between a first position (FIG. 1) wherein levers 22 and 23 are substantially aligned with each other and guide 19 is substantially horizontal; and a second position wherein levers 22 and 23 form an acute angle and guide 19 slopes downward with its rear end resting on a supporting block 28 integral with frame 8. With guide 19 in the horizontal position, carriage 18 (FIG. 1), together with output conveyor 17, is backed up directly over guide 19, whereas, with guide 19 in the downward-sloping position, carriage 18 (FIG. 2), together with output conveyor 17, is moved into a forward position wherein the rear end of output conveyor 17 is located beneath, and tangent to the periphery of, drum 6, and carriage 18 presents a rear bumper 29 contacting a stop upright 30 (FIG. 2) located on machine 5 substantially beneath drum 6. Carriage 18 and guide 19 are connected by a hydraulic actuator 31 designed to move carriage 18 along guide 19, at any speed, between said back-up and forward positions.

Figure 3:
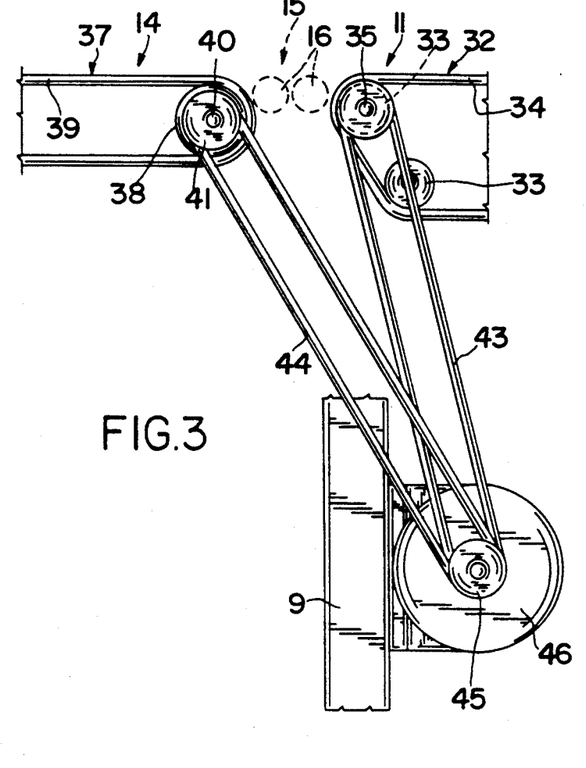
FIG. 3 shows a larger-scale view of a detail in FIG. 1.
Figure 4:
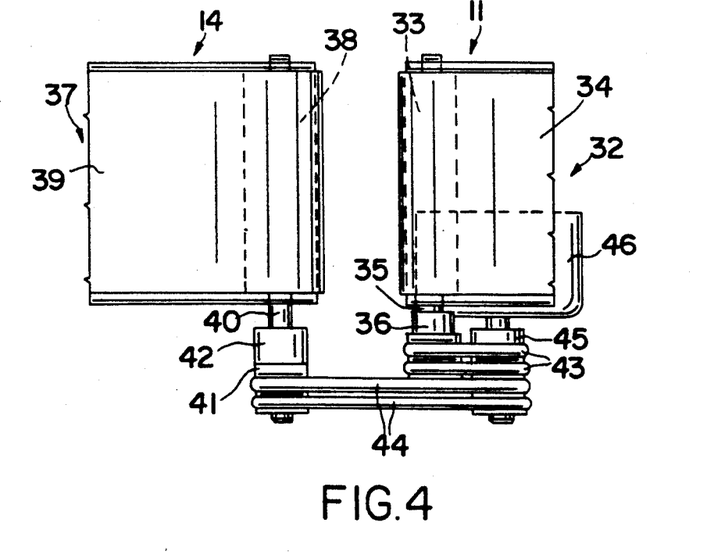
FIG. 4 shows a plan view of the FIG. 3 detail.

As shown in FIGS. 3 and 4, input conveyor 11 comprises a belt 32 looped about a number of rollers 33 (only some of which are shown,) and having a substantially horizontal top branch 34 lying in the same plane as roller bed 10. One of rollers 33, adjacent to transition conveyor 15, which in the example shown comprises only two rollers 16, is fitted onto a central shaft 35 fitted with a pulley 36.

Similarly, intermediate conveyor 14 comprises a belt 37 looped about two rollers 38 (only one of which is shown in FIGS. 3 and 4) and having a substantially horizontal top branch 39 lying in the same plane as roller bed 10. One of rollers 38, adjacent to transition conveyor 15, is fitted onto a central shaft 40 fitted with a pulley 41 via the interposition of a free wheel mechanism or clutch 42.

Pulleys 36 and 41 are connected by respective belts 43 and 44 to a double output pulley 45 of an electric motor 46 connected integral with an upright 9 and designed to move top branches 34 and 39 of belts 32 and 37 towards output conveyor 17 at a substantially constant speed V1 equal to the speed at which tread 3 is extruded by extruder 2. As shown in FIG. 1 and, particularly, in FIGS. 5 and 6, conveyor 17 comprises a belt 47 looped about two rollers 48 and 49, of which roller 48, adjacent to rear roller 38 of intermediate conveyor 14, is fitted onto a central shaft 50 projecting partly outwards of roller 48 and fitted on its free end with a pulley 51 connected integral with a gear 52.

Figure 5:
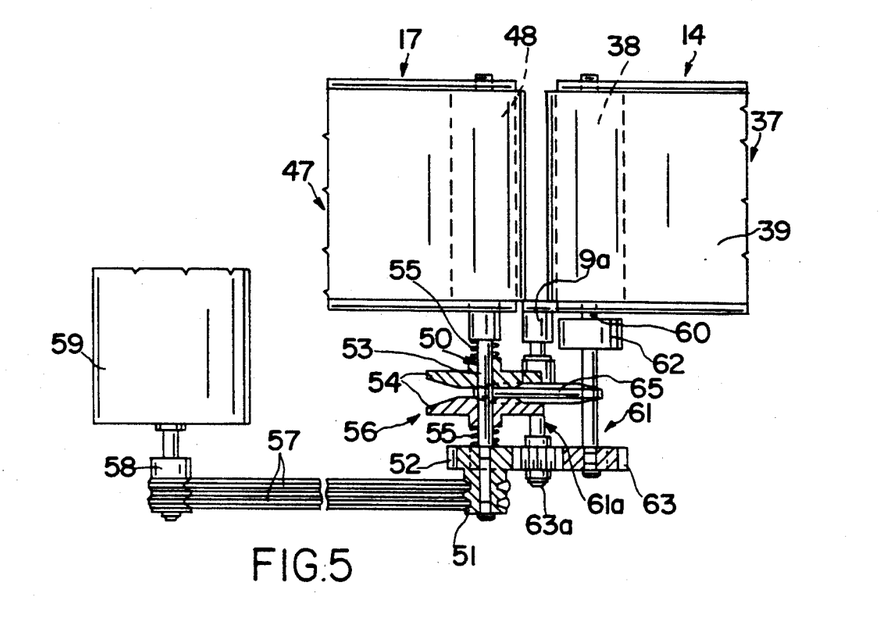
FIGS. 5 and 6 show larger-scale plan views of a further detail in FIG. 1 in two distinct operating positions.
Figure 6:
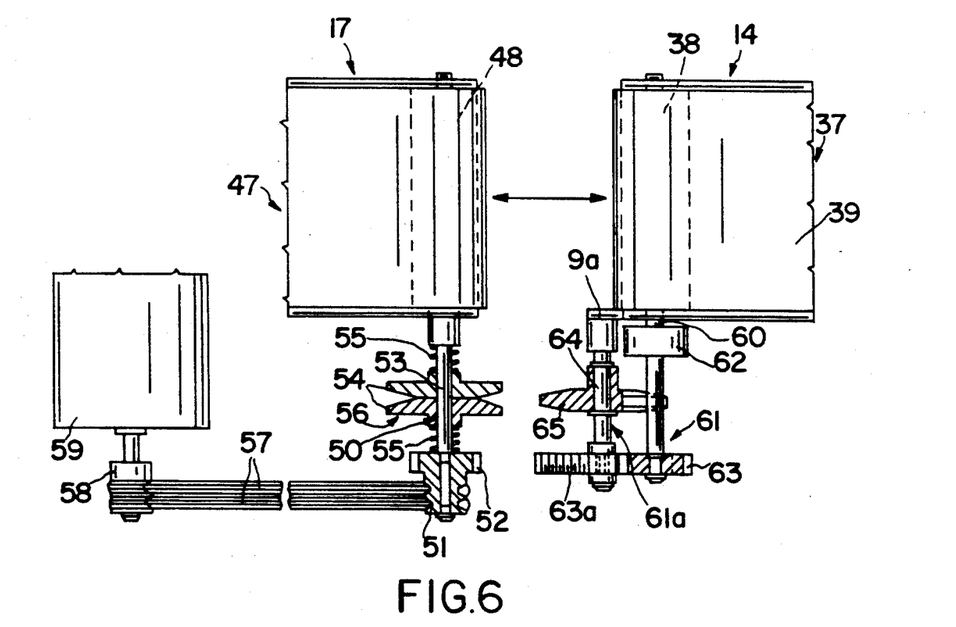

Between gear 52 and roller 48, shaft 50 presents a grooved portion 53 to which are mounted in sliding but angularly-fixed manner two opposed, substantially conical discs 54 pushed against each other by two opposed springs 55. Discs 54 present a larger radius than gear 52, and constitute a synchronizing coupling indicated as a whole by numeral 56. By means of a twin drive belt 57, pulley 51 is connected to the output pulley 58 of an electric motor 59 supported on carriage 18 and designed to selectively operate belt 47 at two distinct speeds V2, V3; V2 being equal to the surface speed of drum 6, and V3 being greater than speed V1.

Rear roller 38 of conveyor 14 is fitted onto a central shaft 60 connected, outwards of roller 38, to a coaxial shaft 61 via the interposition of a releasable, preferably electromagnetic, clutch or free wheel mechanism 62. On the end opposite that connected to free wheel mechanism 62, shaft 61 is fitted with a gear 63 meshing with a gear 63a, which in turn meshes with gear 52 and is fitted onto a shaft 61a mounted for rotation on a bracket 9a connected integral with upright 9. Shaft 61a includes a grooved intermediate portion 64 to which is fitted a biconical disc 65 having a larger radius than gear 63a and constituting a synchronizing disc designed to engage coupling 56 when carriage 18 is moved into the back-up position, and prior to engagement of gears 63a and 52. Operation of feed device 1 will be described with reference to FIGS. 7a–7d.

Figure 7A:
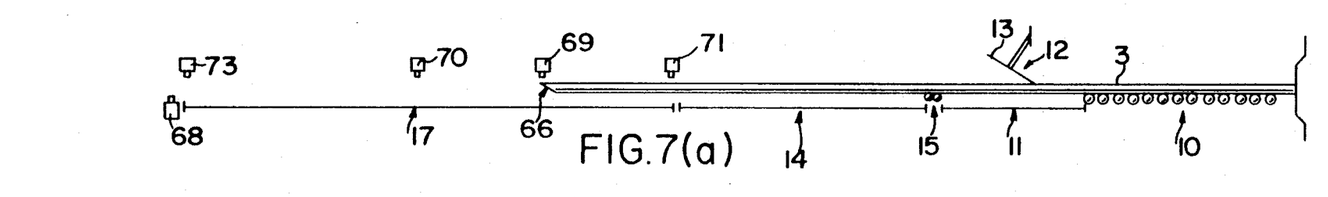
FIGS. 7a, b, c and d show diagrams of the FIG. 1 device in four distinct operating stages.

As shown in FIG. 7a, tread 3 issuing at speed V1 from outlet 7 of extruder 2 is forced by extruder 2 along roller bed 10 until front edge 66 moves over input conveyor 11 which is driven by motor 46 at speed V1. At this point in the operation of feed device 1, motor 59 is deactivated, carriage 18 is set to the back-up position, and clutch 62 is engaged. Consequently, due to the presence of free wheel mechanism 42 and clutch 62, intermediate conveyor 14 and output conveyor 17 are also driven by motor 46 at speed V1.

Figure 7B:
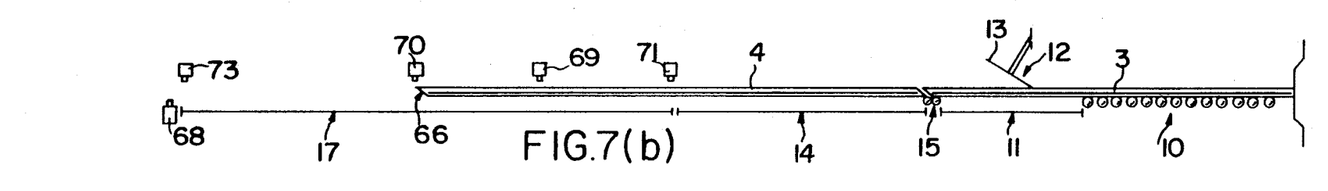
Figure 7C:
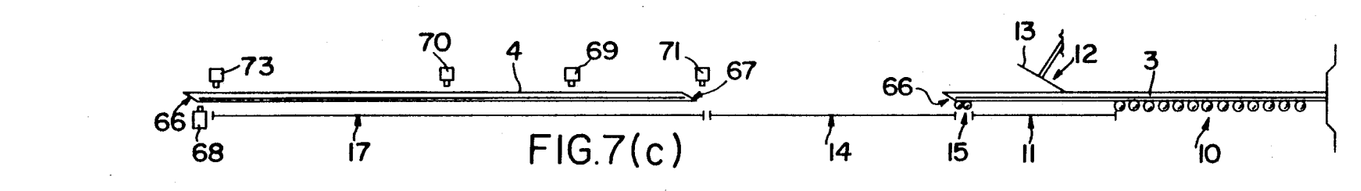
Figure 7D:
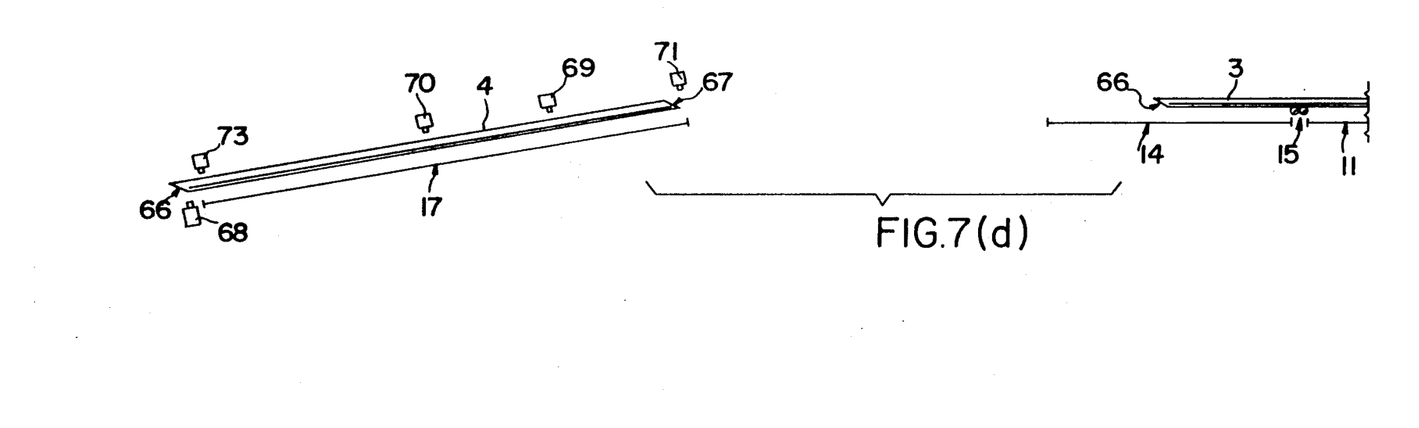

Front edge 66 of tread 3 (FIG. 7a) is thus conveyed at constant speed V1 as far as output conveyor 17, and until a portion of tread 3 equal to the required portion 4 has gone through cutting station 12. At this point, blade 13 is activated for cutting tread 3 into a portion 4 of given length, the rear edge 67 of which travels, together with adjacent front edge 66 of tread 3, at speed V1 up to transition conveyor 15 (FIG. 7b).

Upon rear edge 67 of portion 4 reaching this position, motor 59 is activated for driving output conveyor 17 at speed V3 greater than speed V1, whereas motor 46 continues driving input conveyor 11 at speed V1. As speed V3 is greater than V1, and by virtue of free wheel mechanism 42, intermediate conveyor 14 disengages automatically from motor 46, upon motor 59 being activated at speed V3, and remains connected to motor 59 so as to also travel at speed V3. Motor 59 feeds portion 4 forward at speed V3 until the whole of portion 4 is located on output conveyor 17, i.e. until a relatively short front portion of portion 4 projects from the front end of output conveyor 17 and over an actuating device 68 integral with the front end of output conveyor 17 and which, when activated, provides for raising said projecting front portion of portion 4.

At this point (FIG. 7c), clutch 62 is released, motor 59 is stopped so as to zero the speed (V0 in FIG. 7c) of conveyor 17, and hydraulic actuators 26 and 31 are activated successively (FIG. 7d) for tilting guide 19 downwards and so moving carriage 18 into the forward position for feeding said front portion of portion 4 substantially into contact with the outer periphery of tire building drum 6.

At the same time, stoppage and disconnection of motor 59 from intermediate conveyor 14 enables said intermediate conveyor 14 to connect once more to motor 46 via free wheel mechanism 42 (FIG. 7c) and so travel once more at speed V1. Upon carriage 18 moving into the forward position contacting stop upright 30, and actuating device 68 being activated for "sticking" said front portion of portion 4 onto the periphery of drum 6, motor 59 is re-activated (FIG. 7d) for driving output conveyor 17 at a speed V2 equal to the surface speed of drum 6, thus enabling tread portion 4 to be wrapped correctly about drum 6.

When the whole of tread portion 4 has been fed onto drum 6, motor 59 is de-activated, clutch 62 is engaged, and hydraulic actuators 26 and 31 are re-activated for restoring carriage 18 to the back-up position, thus connecting synchronizing coupling 56 and disc 65 (FIG. 5) for gradually accelerating output conveyor 17 up to speed V1 prior to engaging gears 52 and 63a, and prior to front edge 66 of tread 3 reaching the rear end of intermediate conveyor 14.

In other words, input conveyor 11 is driven constantly and continuously at speed V1 at which tread 3 issues from outlet 7 of extruder 2; intermediate conveyor 14 is driven first at speed V1 and then at speed V3; whereas output conveyor 17 is driven first at speed V1, then at speed V3 and, finally, at speed V2, and is stopped twice, just before and after speed V2, for enabling carriage 18 to move to and from drum 6 at any required speed, and with no distortion of tread portion 4 on output conveyor 17.

Operation of feed device 1 is obviously controlled in known manner by position sensors or similar located along device 1 itself. In particular, and as shown schematically in FIGS. 7 and in FIGS. 1 and 2, motor 46 is activated simultaneously with extruder 2, and is kept running for as long as extruder 2 is operative. A first photocell 69, located in an adjustable position on output conveyor 17 and at a distance from cutting station 12 substantially equal to the length of tread portion 4, is activated by the passage of front edge 66 of tread 3, for activating blade 13 and cutting tread 3. A second photocell 70, located in an adjustable position on output conveyor 17 and at a distance from the output edge of input conveyor 11 equal to the length of portion 4, is activated by the passage of front edge 66 of portion 4, for activating motor 59 at speed V3 and supplying current to a third photocell 71 located in an adjustable position close to the input of output conveyor 17 and activated by the passage of rear edge 67 of tread portion 4, for releasing clutch 62, arresting motor 59, and moving output conveyor 17 into the forward position. Upon contacting upright 30 and receiving an enabling signal from drum 6, a proximity contact 72 on bumper 29 (FIGS. 1 and 2) provides for successively activating actuator 68, for feeding portion 4 onto drum 6, and motor 59 for driving output conveyor 17 at speed V2. Contact 72 also activates a photocell 73 located in an adjustable position close to the output end of output conveyor 17, for arresting motor 59 upon the passage of rear edge 67 of tread portion 4 and, at the same time, restoring output conveyor 17 to the back-up position. In regard to the length of feed device 1, it should be pointed out that roller bed 10 may even be dispensed with, should the output speed of tread 3 from outlet 7 of extruder 2 vary negligibly about an average speed V1; the length of output conveyor 17 is substantially, but preferably at least, equal to the length of tread portion 4; the length of intermediate conveyor 14 is at least equal to the distance covered by tread 3 at speed V1 in the time taken for carriage 18 to move from and back to the back-up position; and the length ratio of transition conveyor 15 and intermediate conveyor 14 is substantially equal to the speed V1-V2 ratio, in that front edge 66 of tread 3 must travel along transition conveyor 15 at speed V1 in the same time taken by the foregoing rear edge 67 of portion 4 to travel along intermediate conveyor 14 at speed V3.

As such, feed device 1 presents a minimum possible total length enabling device 1 to successively feed portions 4 onto drum 6 while at the same time preserving as much extrusion heat as possible, thus improving adhesion of portions 4 to the respective outer carcasses (not shown) and of the opposite ends of each portion 4, with no need for adhesives, and enabling considerable energy saving when curing, providing of course this is performed immediately after building.

According to a variation not shown, free wheel device 42 and clutch 62 may be replaced by other types of controllable couplings, or by a motor connected permanently to intermediate conveyor 14 for selectively driving the same at speeds V1 and V3.

Figure 8:
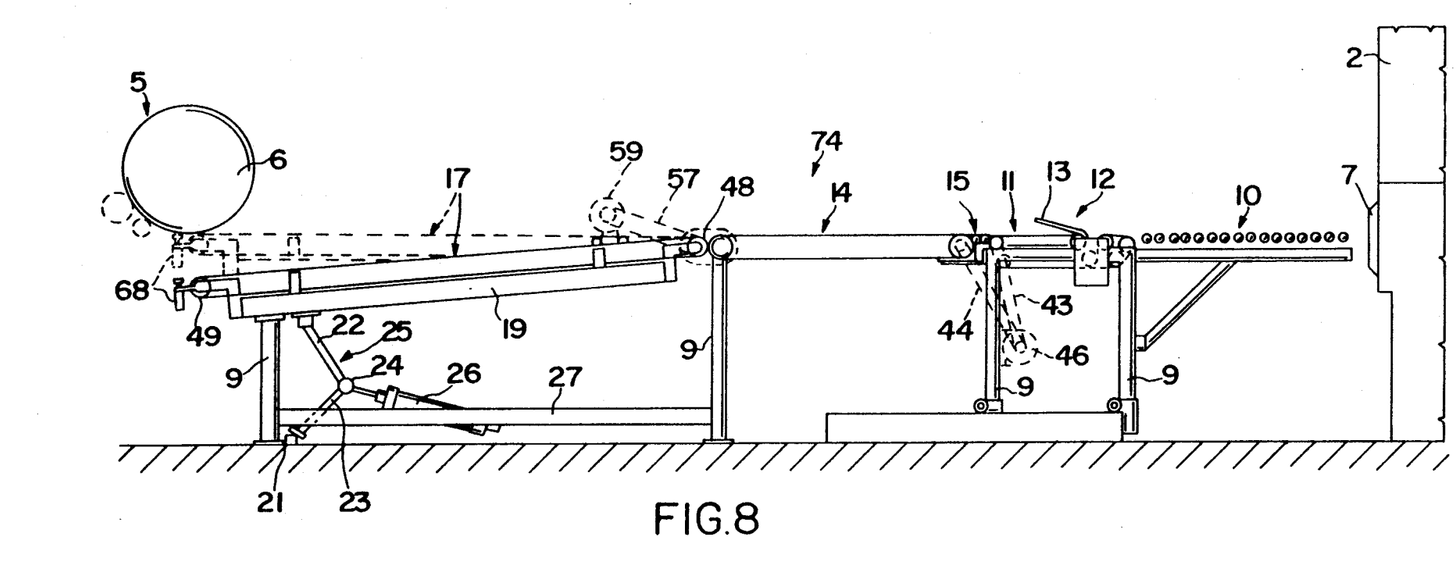
FIG. 8 shows a similar view to that of FIG. 1 relative to a variation of the FIG. 1 device.

The FIG. 8 variation relates to a feed device 74 mostly similar to device 1 and the corresponding component parts of which are indicated using the same numbering system as for device 1. The only substantial difference between device 74 and device 1 is that carriage 18 and respective actuator 31 are dispensed with, and provision made for a guide 19 directly supporting conveyor 17 and connected to frame 8 so as to turn about an axis substantially coincident with the axis of shaft 50, and move, by virtue of compass 25 and actuator 26, to and from the periphery of drum 6, between a lowered position wherein portions 4 are fed forward, and a raised position wherein portions 4 are fed onto drum 6, which, in this case, is obviously located over the front end of output conveyor 17.

Unlike device 1, the operating cycle of conveyor 17 on device 74 provides for only four changes in speed: from V1 to V3; from V3 to V2 via a synchronizing pause V0 which, though not strictly necessary, is nevertheless still provided for; and from V2 to V1 with no interruption.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. In combination, a tire building drum, an extruder for continuously extruding a continuous strip of hot tread at a generally constant speed V1, and a device for feeding portions of said tread along a given route between said extruder and said tire building drum, wherein said device includes first conveyor means for receiving said tread from said extruder and feeding it along a first portion of said route; first activating means for driving said first conveyor means at the speed V1; cutting means associated with said first conveyor means for cutting said tread transversely into tread portions of a given length as said tread moves along the first conveyor means; second conveyor means for successively feeding said tread portions toward said tire building drum; second activating means for selectively driving said second conveyor means at speed V1 and at a speed V3, wherein speed V3 is greater than speed V1; third conveyor means of substantially the same length as said tread portion, for successively feeding the tread portions from the second conveyor means onto the tire building drum; third activating means for selectively driving said third conveyor means at said speeds V1 and V3, and at a speed V2 which is equal to an absorption speed of the tire building drum; means for applying a front portion of each of said tread portions onto said tire building drum; said second activating means includes free wheel means for selectively connecting the first activating means to the second conveyor means, and for selectively connecting the third activating means to the second conveyor means, to selectively drive said second conveyor means at speeds V1 and V3.

2. The combination defined in claim 1 including carriage means for supporting the third conveyor means and push means for moving sad carriage means towards and from said tire building drum along an end portion of said route.

3. The combination defined in claim 2 in which the carriage means includes a tiltable guide for moving the carriage means into a forward position adjacent the tire building drum.

4. The combination defined in claim 2 including synchronizing means located between and in operative engagement with the second and third conveyor means for moving said second and third conveyor means at speed V3 until the carriage means moves towards the tire building drum wherein said third conveyor means moves at speed V2.

* * * * *